US010066961B2

(12) United States Patent
Korzunov

(10) Patent No.: US 10,066,961 B2
(45) Date of Patent: Sep. 4, 2018

(54) METHODS AND SYSTEMS FOR PREDICTING DRIVING CONDITIONS

(71) Applicant: YANDEX EUROPE AG, Lucerne (CH)

(72) Inventor: Anton Vasilyevich Korzunov, Podolsk (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/464,398

(22) Filed: Mar. 21, 2017

(65) Prior Publication Data

US 2017/0284824 A1    Oct. 5, 2017

(30) Foreign Application Priority Data

Apr. 4, 2016 (RU) ................................ 2016112613

(51) Int. Cl.
*G01C 21/36* (2006.01)
*B60W 30/16* (2012.01)
(Continued)

(52) U.S. Cl.
CPC ......... *G01C 21/3697* (2013.01); *B60W 50/14* (2013.01); *G01C 21/362* (2013.01);
(Continued)

(58) Field of Classification Search
CPC .............. G01C 21/3697; G01C 21/362; G01C 21/3629; G01C 21/3661; G01C 21/3667;
(Continued)

(56) References Cited

U.S. PATENT DOCUMENTS 5,862,511 A    1/1999  Croyle et al.
5,948,043 A    9/1999  Mathis
(Continued)

FOREIGN PATENT DOCUMENTS

EP      1273496 B1    11/2005
WO   2005076031 A2    8/2005

OTHER PUBLICATIONS

English Abstract of EP1273496 retrieved on Espacenet on Mar. 21, 2017.

*Primary Examiner* — Marthe Y Marc-Coleman
(74) *Attorney, Agent, or Firm* — BCF LLP

(57) ABSTRACT

A method and system for providing a predicted driving condition to an electronic device associated with a current vehicle having a current vehicle characteristic. The method is executable on a server and comprises receiving an indication of the current vehicle approaching a road segment and the current vehicle characteristic; identifying a preceding vehicle which has a time of travel along the road segment before a current time, a time difference between the preceding vehicle time of travel and the current time being within a predetermined range, the preceding vehicle having a preceding vehicle characteristic; determining the predicted driving condition for the road segment, the predicted driving condition being based on the current vehicle characteristic and the preceding vehicle characteristic; and providing to the electronic device before the current vehicle reaches the road segment, the predicted driving condition for the current vehicle on the road segment.

20 Claims, 4 Drawing Sheets

(51) Int. Cl.
*B60W 40/04* (2006.01)
*B60W 40/06* (2012.01)
*B60W 50/00* (2006.01)
*B60W 50/14* (2012.01)

(52) U.S. Cl.
CPC ..... *G01C 21/3629* (2013.01); *G01C 21/3661* (2013.01); *G01C 21/3667* (2013.01); *G01C 21/3694* (2013.01); *B60W 2550/12* (2013.01); *B60W 2550/14* (2013.01); *B60W 2550/302* (2013.01); *B60W 2550/40* (2013.01); *B60W 2550/402* (2013.01); *G01C 21/3652* (2013.01)

(58) Field of Classification Search
CPC ........... G01C 21/3694; G01C 21/3652; B60W 50/14; B60W 2550/12; B60W 2550/14; B60W 2550/302; B60W 2550/40; B60W 2550/402
USPC ......................................................... 701/49
See application file for complete search history.

(56) References Cited

U.S. PATENT DOCUMENTS

| | | | |
|---|---|---|---|
| 9,873,427 B2 * | 1/2018 | Danzl | B60W 30/09 |
| 2002/0177950 A1 | 11/2002 | Davies | |
| 2014/0067265 A1 | 3/2014 | Maston | |
| 2015/0168169 A1 | 6/2015 | Caceres et al. | |
| 2015/0178572 A1 | 6/2015 | Omer et al. | |
| 2016/0189544 A1 * | 6/2016 | Ricci | G07C 5/008 701/117 |

* cited by examiner

METHODS AND SYSTEMS FOR PREDICTING DRIVING CONDITIONS

CROSS-REFERENCE

The present application claims priority to Russian Patent Application No. 2016112613, filed Apr. 4, 2016, entitled "METHODS AND SYSTEMS FOR PREDICTING DRIVING CONDITIONS", the entirety of which is incorporated herein by reference.

FIELD

The present technology relates to methods and systems for predicting driving conditions.

BACKGROUND

Mapping and/or navigation methods and systems generally provide maps and routes between a start position and a destination position to electronic devices which may be associated with vehicles. The electronic devices may be a smart phone, a tablet or a vehicle navigational device. Some of these known methods and systems may also provide driving conditions along the route, such as a weather condition or a traffic condition. In some instances this may be useful to a user operating the vehicle. However, in some other instances, the driving condition is too general as to be useful for optimising or improving a driving efficiency of the vehicle.

SUMMARY

Aspects and embodiments of the present technology aim to address at least the above-identified problem and/or to provide an improvement by providing a method and a system for providing a predicted driving condition to an electronic device associated with a vehicle, the driving condition being personalized to a characteristic of that vehicle. As will be explained below, in some embodiments, the predicted driving condition can allow the improvement or the optimisation of a driving efficiency of the vehicle. Driving efficiency can be defined as any one or more of a vehicle performance parameter, such as fuel or energy consumption, a journey efficiency such as time to destination, a hazard risk, such as a tipping of the vehicle, vehicle drift, tyre slippage, and the like. In various non-limiting embodiments, driving efficiency includes a vehicle performance parameter and a hazard risk.

Aspects and embodiments of the present technology have been developed based on present inventors' appreciation that methods and systems of the prior art which predict driving conditions, such as road and weather conditions, only provide a general overview of the driving conditions. For an example demonstrating this appreciation of the problem, consider a vehicle travelling along a curved section of a road. Generally, it is known that a reduced speed limit is applicable on the curved section of the road compared to a straight stretch of road. However, for each vehicle, there may be an optimal reduced speed at which to drive along the curved section of the road which not only avoids a hazardous event such as a tyre of the vehicle slipping, vehicle tipping or vehicle drifting but can also optimise the vehicle performance such as the fuel consumption of the vehicle or another performance parameter whilst driving along the curved section of the road.

The inventors also noted that there are many different vehicle characteristics which can affect the driving efficiency of the vehicle on the road segment, and by differing extents. In addition, they noted that external conditions may also affect a particular vehicle's performance and hazard risk on the road segment such as climate, weather and road surface conditions, and again by different extents. By means of an example, take the performance of a 6-wheel truck on the curved section of the road, and compare this with a sports car driving the same curved section of the road under the same external conditions. The truck and the sports car may need to drive the curved section of the road at different speeds to minimise the hazard risk and also to optimise the vehicle performance because of the difference in properties between the truck and the sports car.

From one aspect, there is provided a method for providing a predicted driving condition to an electronic device, the electronic device being associated with a current vehicle having a current vehicle characteristic, the method executable on a server, the method comprising: receiving, by the server, an indication of the current vehicle approaching a road segment and the current vehicle characteristic of the current vehicle; identifying, by the server, at least one preceding vehicle which has a time of travel along the road segment which is before a current time, a time difference between the preceding vehicle time of travel and the current time being within an acceptable predetermined range, the preceding vehicle having a preceding vehicle characteristic; determining, by the server, the predicted driving condition for the current vehicle for the road segment, the predicted driving condition being based on the current vehicle characteristic of the current vehicle and the preceding vehicle characteristic of the preceding vehicle; and providing, by the server, to the electronic device associated with the current vehicle before the current vehicle reaches the road segment, the predicted driving condition for the current vehicle on the road segment.

In certain embodiments of any of the foregoing or following, the current vehicle characteristic comprises a plurality of current vehicle characterisation parameters representative of an identification of the current vehicle. In certain embodiments, the preceding vehicle characteristic comprises a plurality of preceding vehicle characterisation parameters representative of an identification of the preceding vehicle. The determining of the predicted driving condition for the current vehicle for the road segment is based on an identified pattern between various parameters including vehicle characteristic parameters and parameters describing a vehicle performance. Advantageously, a driving prediction specific to the current vehicle can be provided based on a minimum of two inputs (the current vehicle characteristic and the preceding vehicle characteristic). A weather condition or a road condition is not required but can also be used in certain embodiments.

In certain embodiments of any of the foregoing or following, the acceptable predetermined range in the time difference between the preceding vehicle time of travel and the current time can be any predetermined interval of time. In certain embodiments, the acceptable predetermined range in the time difference between the preceding vehicle time of travel and the current time is any one of 1-5 minutes, 5-10 minutes, 10-15 minutes, 15-20 minutes, 20-25 minutes, 25-30 minutes, 30-35 minutes, 35-40 minutes, 40-45 minutes, 45-50 minutes, 50-55 minutes, 55-60 minutes, or any other suitable predetermined value such as less than 5 minutes, less than 10 minutes, less than 15 minutes, less than 20 minutes, less than 25 minutes, less than 30 minutes, less than 35 minutes, less than 40 minutes, less than 50 minutes, less than 55 minutes, less than 60 minutes. The time of travel of the preceding vehicle can be the same as the current time. In other words, the preceding vehicle can be travelling along the road segment or have reached the road segment at the same time as the current vehicle is approaching the road segment. In certain embodiments, the preceding vehicle has a same or similar direction of travel as the current vehicle.

In certain embodiments of any of the foregoing or following, the method further comprises obtaining a preceding vehicle performance of the at least one preceding vehicle along the road segment, and wherein the determining of the predicted driving condition for the current vehicle for the road segment is also based on the preceding vehicle performance of the preceding vehicle. The server can obtain the preceding vehicle performance in any way.

In certain embodiments of any of the foregoing or following, the method further comprises obtaining a current road condition of the road segment (e.g. at the time of receiving the indication of the current vehicle approaching the road segment), and wherein the determining of the predicted driving condition for the current vehicle for the road segment is also based on the current road condition. The server can obtain the current road condition in any way.

In certain embodiments of any of the foregoing or following, the current road condition is calculated from a current weather condition and a historic road condition of the road segment.

In certain embodiments of any of the foregoing or following, the method further comprises obtaining a current weather condition at the time of receiving the indication of the current vehicle approaching the road segment, and wherein the determining of the predicted driving condition for the current vehicle for the road segment is also based on the current weather condition. The server can obtain the current weather condition in any way.

In certain embodiments of any of the foregoing or following, the identifying the at least one preceding vehicle comprises accessing a database in which data on the at least one preceding the vehicle is stored, the data including the preceding vehicle characteristic and the time of travel along the road segment of the preceding vehicle.

In certain embodiments of any of the foregoing or following, the determining the predicted driving condition comprises inputting a current input comprising the current vehicle characteristic and the preceding vehicle characteristic into a machine-learning algorithm, the machine-learning algorithm having been trained on training inputs comprising datasets from a plurality of training vehicles which had traveled along the road segment, each dataset comprising, for a given training vehicle from the plurality of training vehicles, a training vehicle characteristic of the given training vehicle and a training vehicle performance of the given training vehicle whilst it had traveled along the road segment. The training of the machine-learning algorithm need not be performed by the server but could be performed by a prediction module which is accessible by the server. In alternative embodiments, one or more of the preceding vehicle performance, the current road condition and/or the current weather condition can be input to the trained MLA. In alternative embodiments, a real-time analysis of data within a computer model is used instead of a trained machine-learning algorithm.

In certain embodiments of any of the foregoing or following, each dataset has a time stamp representing a time when the given vehicle had traveled along the road segment, the machine-learning algorithm having been trained on datasets obtained within an acceptable predetermined time range of the time stamp relative to the current time. The acceptable predetermined time range of the time stamp relative to the current time can be any suitable value. Non-limiting examples are: less than 18 months, less than 17 months, less than 16 months, less than 15 months, less than 14 months, less than 13 months, less than 12 months, less than 11 months, and less than 10 months.

In certain embodiments of any of the foregoing or following, the plurality of datasets are from a plurality of vehicles traveling along a plurality of different road segments, each dataset including a geolocation of each one of the plurality of different road segments. Datasets relevant to a particular geolocation can be used to train the machine-learning algorithm for that specific geolocation.

In certain embodiments of any of the foregoing or following, at least one of the plurality of datasets includes at least one of:
  a training road condition of the road segment whilst the given training vehicle was traveling along the road segment, and
  a training weather condition at the road segment whilst the given training vehicle was traveling along the road segment.

In certain embodiments of any of the foregoing or following, the training input also includes a weighting of a plurality of training vehicle characteristic parameters of the training vehicle characteristic and/or a weighting of a plurality of training vehicle performance parameters of the training vehicle performance. In certain embodiments of any of the foregoing or following, the training input also includes a weighting of a plurality of training weather condition of the training weather condition and/or a weighting of a plurality of training road condition parameters of the training road conditions. The weighting may be related to a vehicle performance on the road segment as a function of a weather parameter and/or a road condition parameter.

In certain embodiments of any of the foregoing or following, the method further comprises determining by the server whether to send the predicted driving condition to the electronic device based on a trigger.

In certain embodiments of any of the foregoing or following, the method further comprises receiving, by the server, a current vehicle performance of the current vehicle, the current vehicle performance comprising a plurality of current vehicle performance parameters, wherein the trigger comprises at least one of the current performance parameters of the current vehicle being outside of a predetermined acceptable threshold range. In a non-limiting example, the server will determine to send the predicted driving condition to the electronic device if the current vehicle is approaching the road segment at a speed which exceeds a safe speed limit for the current vehicle on that road segment.

In certain embodiments of any of the foregoing or following, the method further comprises receiving, by the server, a current road condition of the road segment, the current road condition comprising a plurality of current road condition parameters, wherein the trigger comprises at least one of the current road condition parameters being outside of a predetermined acceptable threshold range. In a non-limiting example, the server will determine to send the predicted driving condition to the electronic device if the sever identifies that there is ongoing road maintenance at the road segment, a pothole has appeared at the road segment, or there is traffic congestion.

In certain embodiments of any of the foregoing or following, the method further comprises receiving, by the server, a current weather condition at the road segment, the current weather condition comprising a plurality of current weather condition parameters, wherein the trigger comprises at least one of the current weather condition parameters being outside of a predetermined acceptable threshold range. In a non-limiting example, the server will determine to send the predicted driving condition to the electronic device if the sever identifies that visibility has been reduced, or if it is raining heavily.

In certain embodiments of any of the foregoing or following, the current road condition or the training road condition each comprise at least one of the following parameters: a temperature of a surface of the road segment, a continuity of a surface of the road segment, a grade of a surface of the road segment, a material of a surface of the road segment, and presence/extent of debris on a surface of the road segment.

In certain embodiments of any of the foregoing or following, the current weather condition or the training weather condition each comprise at least one of the following parameters: an air temperature, air pressure, air humidity, air quality, ultra-violet light levels, rain, snow, sleet, ice rain, fog, wind speed, wind direction, brightness levels, sun direction, glare, and shadow levels.

In certain embodiments of any of the foregoing or following, the current vehicle performance, the preceding vehicle performance or the training vehicle performance each comprise at least one of the following parameters: a slippage of the vehicle, a speed of the vehicle, drifting of the vehicle, vibration of the vehicle, a pressure of a tyre of the vehicle, a pressure distribution in tyres of the vehicle, engine temperature, fuel consumption, a tipping of the vehicle, engine control unit (ECU) data, and sensor output data.

In certain embodiments of any of the foregoing or following, the current vehicle characteristic, the preceding vehicle characteristic and the training vehicle characteristic each comprise at least one of the following parameters: vehicle manufacturer, vehicle model, vehicle year of manufacture, vehicle weight, vehicle dimensions, vehicle weight distribution, vehicle surface area, vehicle height, drive train type, tyre type, brake system, fuel system, mileage, vehicle identification number, and engine size.

In certain embodiments of any of the foregoing or following, the predicted driving condition provided to the electronic device comprises an instruction for the vehicle or the user to take a driving action.

In certain embodiments of any of the foregoing or following, the instruction is at least one of: reducing speed, increasing speed, maintaining speed, applying brakes, releasing brakes, stopping, taking an alternative route, switching gear, turning on or off headlights, adapting headlight angle, adapting the direction of travel, paying attention, and keeping a certain distance from a vehicle in front.

In certain embodiments of any of the foregoing or following, the instruction to the vehicle also includes a command to a control unit of the vehicle from the electronic device to adapt an operation of the vehicle. In these embodiments, the vehicle may be a driverless car.

In certain embodiments of any of the foregoing or following, the instruction comprises a command to display a visual representation of the driving action on a display of the electronic device. In a non-limiting example, the driving action can be displayed in words on the display of the electronic device. The words could be overlaid on a map of the route currently being followed by the current vehicle.

In certain embodiments of any of the foregoing or following, the instruction comprises a command to communicate an audio representation of the driving action on the electronic device. In a non-limiting example, the audio representation of the driving action is a voice speaking the driving action.

In certain embodiments of any of the foregoing or following, the receiving is executed in response to the user of the electronic device providing an indication of a user-desire to receive the predicted driving condition. In a non-limiting example, this could be a user indicating a desire to receive the predicted driving condition through an on-line application such as Yandex™ Maps.

In certain embodiments of any of the foregoing or following, receiving the indication of the current vehicle approaching the road segment by the server is via a Global Positioning System.

From another aspect, there is provided a computer-implemented system for providing a predicted driving condition to an electronic device, the electronic device being associated with a current vehicle having a current vehicle characteristic, the system comprising: a receiver configured to receive an indication of the current vehicle approaching a road segment and the current vehicle characteristic of the current vehicle; a processor configured to: identify at least one preceding vehicle which has a time of travel along the road segment which is before a current time, a time difference between the preceding vehicle time of travel and the current time being within an acceptable predetermined range, the preceding vehicle having a preceding vehicle characteristic; and determine by the server, the predicted driving condition for the current vehicle for the road segment, the predicted driving condition being based on the current vehicle characteristic of the current vehicle and the preceding vehicle characteristic of the preceding vehicle; a transmitter for transmitting, to the electronic device associated with the current vehicle before the current vehicle reaches the road segment, the predicted driving condition for the current vehicle on the road segment.

In certain embodiments of any of the foregoing or following, the processor is further configured to obtain a preceding vehicle performance of the at least one preceding vehicle along the road segment, and base the determining of the predicted driving condition for the current vehicle for the road segment also on the preceding vehicle performance of the preceding vehicle.

In certain embodiments of any of the foregoing or following, the processor is further configured to obtain a current road condition at the time of receiving the indication of the current vehicle approaching the road segment, and base the determining of the predicted driving condition for the current vehicle for the road segment also on the current road condition.

In certain embodiments of any of the foregoing or following, the processor is further configured to calculate the current road condition from a current weather condition and a historic road condition of the road segment.

In certain embodiments of any of the foregoing or following, the processor is further configured to obtain a current weather condition at the time of receiving the indication of the current vehicle approaching the road segment, and base the determining of the predicted driving condition for the current vehicle for the road segment also on the current weather condition.

In certain embodiments of any of the foregoing or following, the processor is configured to access a database in which data on the at least one preceding the vehicle is stored, the data including the preceding vehicle characteristic and the time of travel along the road segment of the preceding vehicle, to identify the at least one preceding vehicle.

In certain embodiments of any of the foregoing or following, the determining the predicted driving condition comprises inputting a current input comprising the current vehicle characteristic and the preceding vehicle characteristic into a machine-learning algorithm, the machine-learning algorithm having been trained on training inputs comprising datasets from a plurality of training vehicles which had traveled along the road segment, each dataset comprising, for a given training vehicle from the plurality of training vehicles, a training vehicle characteristic of the given training vehicle and a training vehicle performance of the given training vehicle whilst it had traveled along the road segment.

In certain embodiments of any of the foregoing or following, each dataset has a time stamp representing a time when the given vehicle had traveled along the road segment, the machine-learning algorithm having been trained on datasets obtained within an acceptable predetermined time range of the time stamp relative to the current time.

In certain embodiments of any of the foregoing or following, the plurality of datasets are from a plurality of vehicles traveling along a plurality of different road segments, each dataset including a geolocation of each one of the plurality of different road segments.

In certain embodiments of any of the foregoing or following, at least one of the plurality of datasets includes a training road condition of the road segment whilst the given training vehicle was traveling along the road segment.

In certain embodiments of any of the foregoing or following, at least one of the plurality of datasets includes a training weather condition at the road segment whilst the given training vehicle was traveling along the road segment.

In certain embodiments of any of the foregoing or following, the training input also includes a weighting of a plurality of training vehicle characteristic parameters of the training vehicle characteristic and/or a weighting of a plurality of training vehicle performance parameters of the training vehicle performance.

In certain embodiments of any of the foregoing or following, the training input also includes a weighting of a plurality of training weather condition of the training weather condition and/or a weighting of a plurality of training road condition parameters of the training road conditions.

In certain embodiments of any of the foregoing or following, the processor is configured to determine whether to send the predicted driving condition to the electronic device based on a trigger.

In certain embodiments of any of the foregoing or following, the processor is configured to receive a current vehicle performance of the current vehicle, the current vehicle performance comprising a plurality of current vehicle performance parameters, wherein the trigger comprises at least one of the current performance parameters of the current vehicle being outside of a predetermined acceptable threshold range.

In certain embodiments of any of the foregoing or following, the processor is configured to receive a current road condition of the road segment, the current road condition comprising a plurality of current road condition parameters, wherein the trigger comprises at least one of the current road condition parameters being outside of a predetermined acceptable threshold range.

In certain embodiments of any of the foregoing or following, the processor is configured to receive a current weather condition at the road segment, the current weather condition comprising a plurality of current weather condition parameters, wherein the trigger comprises at least one of the current weather condition parameters being outside of a predetermined acceptable threshold range.

In certain embodiments of any of the foregoing or following, the current road condition or the training road condition each comprise at least one of the following parameters: a temperature of a surface of the road segment, a continuity of a surface of the road segment, a grade of a surface of the road segment, a material of a surface of the road segment, and presence/extent of debris on a surface of the road segment.

In certain embodiments of any of the foregoing or following, the current weather condition or the training weather condition each comprise at least one of the following parameters: an air temperature, air pressure, air humidity, air quality, ultra-violet light levels, rain, snow, sleet, ice rain, fog, wind speed, wind direction, brightness levels, sun direction, glare, and shadow levels.

In certain embodiments of any of the foregoing or following, the current vehicle performance, the preceding vehicle performance or the training vehicle performance each comprise at least one of the following parameters: a slippage of the vehicle, a speed of the vehicle, drifting of the vehicle, vibration of the vehicle, a pressure of a tyre of the vehicle, a pressure distribution in tyres of the vehicle, engine temperature, fuel consumption, a tipping of the vehicle, engine control unit (ECU) data, and sensor output data.

In certain embodiments of any of the foregoing or following, the current vehicle characteristic, the preceding vehicle characteristic and the training vehicle characteristic each comprise at least one of the following parameters: vehicle manufacturer, vehicle model, vehicle year of manufacture, vehicle weight, vehicle dimensions, vehicle weight distribution, vehicle surface area, vehicle height, drive train type, tyre type, brake system, fuel system, mileage, vehicle identification number, and engine size.

In certain embodiments of any of the foregoing or following, the predicted driving condition provided to the electronic device comprises an instruction for the vehicle or the user to take a driving action.

In certain embodiments of any of the foregoing or following, the instruction is at least one of: reducing speed, increasing speed, maintaining speed, applying brakes, releasing brakes, stopping, taking an alternative route, switching gear, turning on or off headlights, adapting headlight angle, adapting the direction of travel, paying attention, and keeping a certain distance from a vehicle in front.

In certain embodiments of any of the foregoing or following, the instruction to the vehicle also includes a command to a control unit of the vehicle from the electronic device to adapt an operation of the vehicle. In certain embodiments of any of the foregoing or following, the instruction comprises a command to display a visual representation of the driving action on a display of the electronic device. In certain embodiments of any of the foregoing or following, the instruction comprises a command to communicate an audio representation of the driving action on the electronic device.

In certain embodiments of any of the foregoing or following, the processor is configured to receive the indication of the current vehicle approaching the road segment in response to the user of the electronic device providing an indication of a user-desire to receive the predicted driving condition.

In certain embodiments of any of the foregoing or following, wherein receiving the indication of the current vehicle approaching the road segment by the server is via a Global Positioning System.

In certain embodiments of any of the above aspects and/or embodiments, the system further comprises a predicting module in communication with the processor, for generating the predicted driving condition.

By virtue of some embodiments of the present technology, the user and/or the current vehicle is provided with the predicted driving condition ahead of reaching the road segment which may improve or optimise a driving efficiency of the current vehicle, such as by reducing a hazard risk whilst driving along the road segment and/or an improving or optimising a vehicle parameter whilst driving along the road segment.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "memory" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
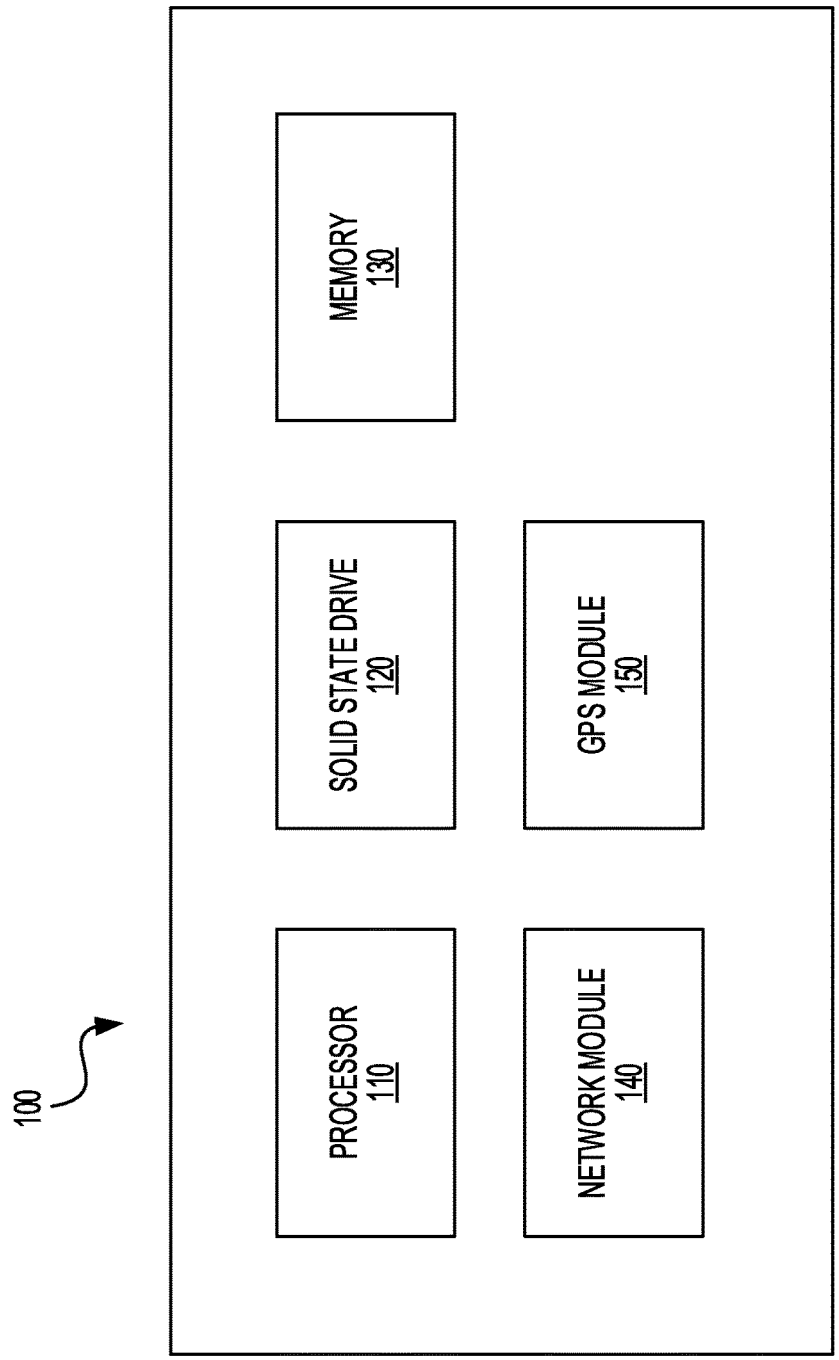
FIG. 1 depicts a schematic diagram of an example computer-implemented system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory, a network module 140, and a GPS module 150. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for providing a predicted driving condition to a user of the system 100. For example, the program instructions may be part of a mapping or navigating application executable by the processor 110. The network module 140 and the GPS module 150 allow communication between different computer systems or other devices.

Figure 2:
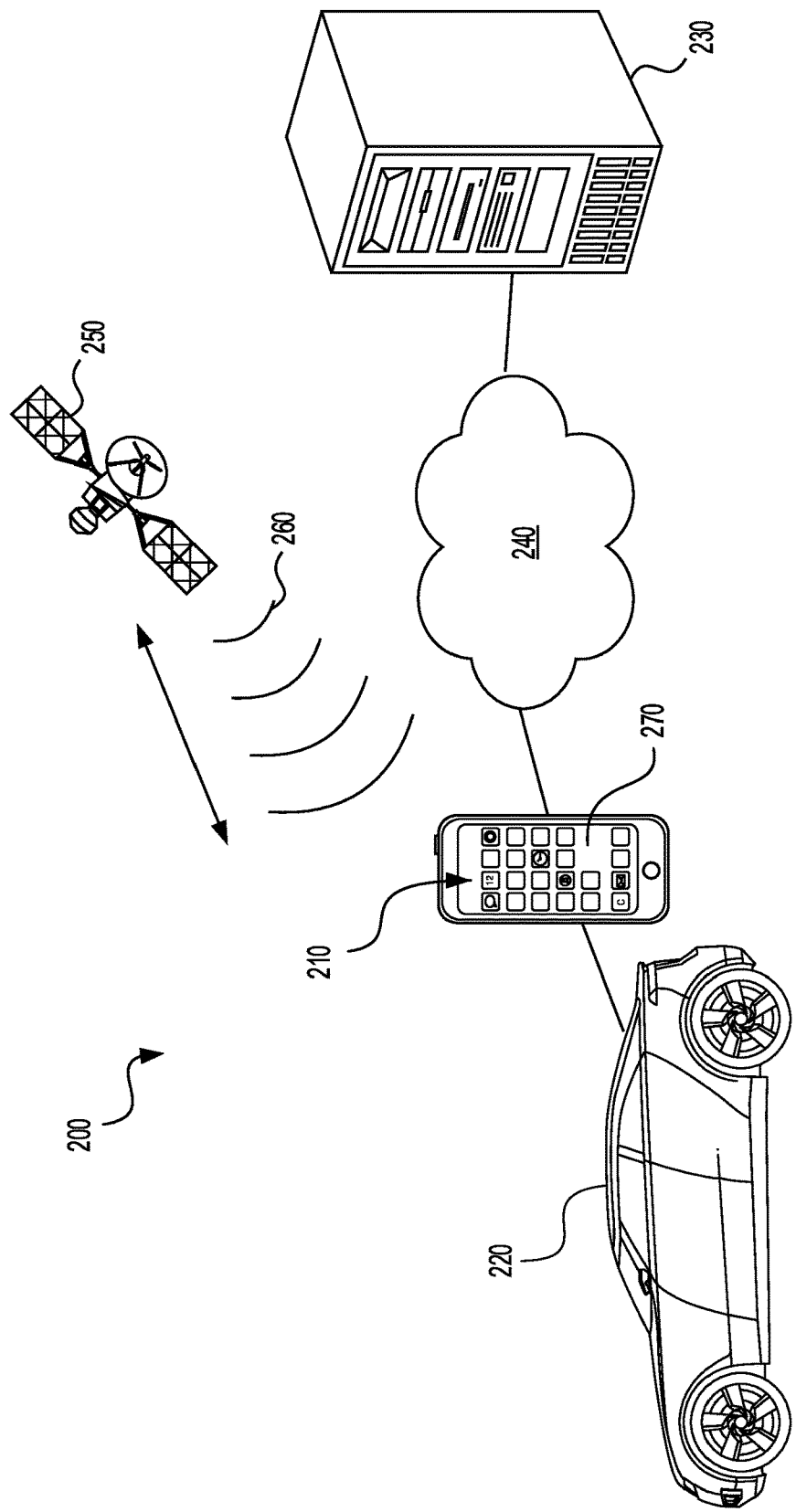
FIG. 2 depicts a schematic diagram of an example networked computing environment in which certain embodiments of systems and/or methods of the present technology may be implemented.

FIG. 2 illustrates a networked computing environment 200 suitable for use with some embodiments of the systems and/or methods of the present technology. The networked computing environment 200 comprises an electronic device 210 associated with a vehicle 220, or associated with a user (not depicted) who can operate the vehicle 220, a server 230 in communication with the electronic device 210 via a communications network 240 (e.g. the Internet or the like, as will be described in greater detail herein below), and a GPS satellite 250 transmitting and/or receiving a GPS signal 260 to/from the electronic device 210. It will be understood that the present technology is not limited to GPS and may employ a positioning technology other than GPS.

The implementation of the electronic device 210 is not particularly limited, but as an example, the electronic device 210 may be implemented as a wireless communication device such as a mobile telephone (e.g. a smart-phone or a radio-phone), a vehicle navigation device (e.g. TomTom™, Garmin™), a vehicle engine control unit, a vehicle CPU, a tablet, a personal computer and the like. In certain embodiments, the electronic device has a display 270.

The electronic device 210 may comprise some or all of the components of the computer system 100 depicted in FIG. 1. In certain embodiments, the electronic device 210 is a mobile computing device and comprises the network module 140 for communicating with the server 230 via the communications network 240, the GPS module 150 for receiving and transmitting the GPS signal 260 to the GPS satellite 250, the processor 110, the memory 130, and a display interface (not shown) coupled to the display 270. The electronic device 210 comprises hardware and/or software and/or firmware, or a combination thereof, for receiving the predicted driving condition, as will be described in greater detail below.

The vehicle 220 to which the electronic device 210 is associated may comprise any leisure or transportation vehicle such as a private or commercial car, truck, motorbike or the like. The vehicle may be user operated or a driver-less vehicle. The vehicle 220 has an individual vehicle characteristic, also referred to as "vehicle characteristic", comprising one or more parameters associated with the vehicle. The one or more parameters of the individual vehicle characteristic may be associated with an identity of the vehicle, and are also referred to as "identity parameters". The identity parameters may be provided by a CPU of the vehicle or by the manufacturer of the vehicle. Examples of the identity parameters include: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size. The electronic device 210 associated with the vehicle 220 is arranged to store the individual vehicle characteristic of that vehicle 220, which may be the vehicle characteristic parameters themselves or a representation of one or more of the individual vehicle characteristic parameters, such as in the memory 130 of the electronic device 210, and/or adapted to transmit the individual vehicle characteristic parameters. It will be appreciated that different vehicles (not shown) may have different individual vehicle characteristic parameters and hence a different vehicle characteristic from one another.

In some embodiments of the present technology, the communication network 240 is the Internet. In alternative non-limiting embodiments, the communication network can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 240 is implemented will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 240 may also use a wireless connection with the server 230.

In some embodiments of the present technology, the server 230 is implemented as a conventional computer server and may comprise some or all of the components of the computer system 1 of FIG. 1. In one non-limiting example, the server 112 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 230 may be distributed and may be implemented via multiple servers.

In some embodiments, the server 230 includes various components including the processor 110, the memory 130, the network module 140 for communicating with the electronic device 210 via the communications network 240, and the GPS module 150 for receiving and/or transmitting the GPS signal 260 from the GPS satellite 250. The server 230 comprises hardware and/or software and/or firmware, or a combination thereof, for determining and sending the predicted driving condition to the electronic device 210, as will be described in greater detail below.

From a broad perspective, embodiments of the present technology provide the predicted driving condition to the vehicle 220 (also referred to as 'current vehicle 220') before that vehicle 220 reaches a road segment, the predicted driving condition being associated with that road segment and with the current vehicle 220 according to the vehicle's vehicle characteristic (also referred to as 'current vehicle characteristic'). The functions of the various components of the server 230 will now be described in greater detail and with reference to embodiments of the present technology.

The road segment may include any part or parts of a road, not limited to the following examples: road sections that present more hazardous conditions, such as on curves, junctions, crossings, blind corners, highways, tunnels, bridges, gradients, exposed sections of road, shady sections of road, road section at high altitude, and the like.

The predicted driving condition can include a driving suggestion such as an instruction to the vehicle 220 or to the user to take a driving action, for example by performing an operation of the vehicle 220, before the vehicle 220 reaches the road segment to which the indication of the driving condition is associated. Non-limiting examples of the instruction include reduce/increase/maintain vehicle speed, reduce or increase speed to x km/h, apply/release brakes, stop the vehicle, navigate an alternative route, switch gear, switch gear up/down, keep going, keep a certain distance from a vehicle in front, adjust headlights, and the like. In some embodiments, the instruction comprises a command to display a visual representation of the instruction or driving action on the display 270 of the electronic device 210. For example, the instruction may comprise a command to display the words "reduce speed to less than 30 km/h" on the display 270, or display a flashing alert. The words could be overlaid on a map displayed on the display 270 of the electronic device 210 and including the road segment. In some embodiments, the instruction comprises a command to emit an audio representation of the driving action on the electronic device 210. The electronic device 210 may be associated with one or more speakers associated with the electronic device for this purpose. An example of the audio representation of the driving action is emission of a voice speaking the instructions, such as the words "reduce speed to less than 30 km/h". In the case of the instruction comprising a command to alert the user associated with the vehicle 220 to pay more attention, for example, the electronic device 210 may flash, buzz, vibrate or sound an alarm. In some embodiments, the instruction to the vehicle 220 also includes a command to a control unit of the vehicle 220, such as the CPU or the engine control unit, from the electronic device 210 to adapt an operation of the vehicle. The vehicle's operation may be adapted automatically on receipt of the command or on receipt of a user initiated trigger. For example, if the predicted driving condition includes an instruction to reduce speed to 25 km/h, a command will be sent to the control unit of the current vehicle 220 to apply brakes until a speed of 25 km/h is reached.

Within some embodiments, the server 230 and/or electronic device 210 can access a web service. The web service is an application executed by or via the server 230, and in one example is a map service for determining a particular route from Point A to Point B. Generally, the user accesses the web service by accessing or logging into a pre-defined web resource hosted on the server 230 through the electronic device 210. In some embodiments, merely as an illustration and not a limitation, the map service is Yandex™ Maps and provides maps and routes to the user who can access the service through entering a pre-defined Unified Resource Locator (URL) into a browser application of the electronic device, such as an example of: maps.yandex.ru/.

Turning now to the manner in which the predicted driving condition for the current vehicle 220 for the road segment can be determined. According to some embodiments of the present technology, the processor 110 associated with the server 230 is structured and configured to execute various processes to determine the driving condition which is specific to the vehicle 220 and to the road segment in order for the predicted driving condition to be provided to the electronic device 210 associated with the vehicle 220 before the vehicle 220 reaches the road segment. According to other embodiments, the processor 110 associated with the electronic device 210 may be configured to execute various processes to determine the driving condition. According to yet other embodiments, the server 230 and the electronic device 210 are configured to execute the various processes to determine the driving condition between them.

Figure 3:
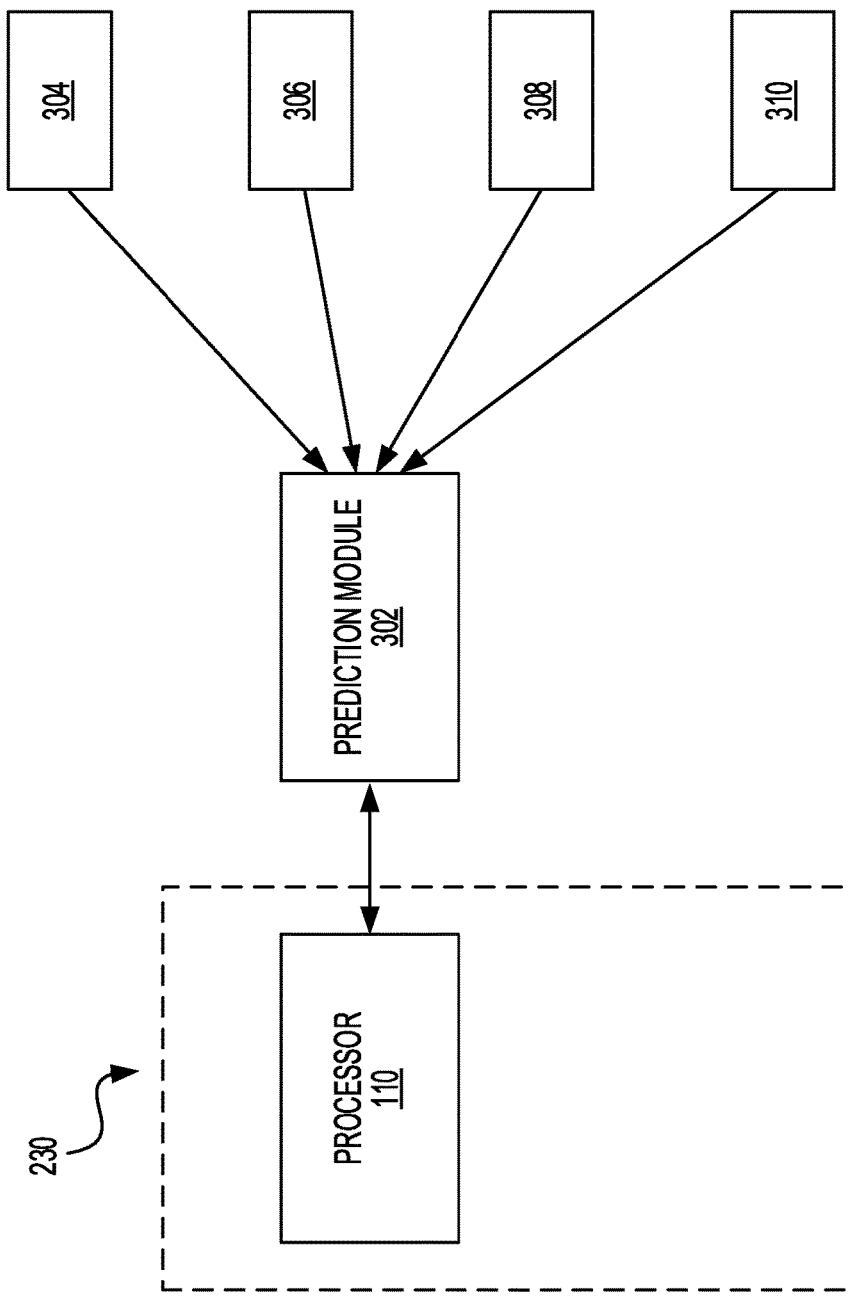
FIG. 3 depicts a schematic diagram of certain components of the system of FIG. 1 in which certain embodiments of systems and/or methods of the present technology may be implemented.

Some embodiments of the present technology in which the processor 110 of the server 230 is configured to determine the driving condition is illustrated in FIG. 3. In these embodiments, the processor 110 of the server 230 is operatively coupled to, or otherwise has access to, a prediction module 302 for determining the predicted driving condition for the current vehicle. In other embodiments (not shown), the processor 110 of the server 230 is configured to determine the predicted driving condition directly. Although shown as being located separately to the server 230, the prediction module 302 may be located at the server 230, or separate to the server 230 but connected thereto. In alternative embodiments, there may be provided a plurality of prediction modules 302 for separately determining the indication of the diving condition for the vehicle 220, for example a first prediction module, a second prediction module, a third prediction module, a fourth prediction module (not shown). In further alternative embodiments, the prediction module 302 may be a prediction server having one or more of the characteristics of a computer system shown in FIG. 1.

The prediction module 302 or the processor 110 is configured to generate the predicted driving condition using a machine-learning model, algorithm or the like. The prediction module 302, the processor 110 or the server 230 is configured to receive a plurality of training inputs, and optionally store these in a database (not shown). In a training phase, the prediction module 302, processor 110, or the server 230 is configured to retrieve and analyze the plurality of training inputs to generate one or more machine-learning models, such as through supervised learning methods or neural networks.

According to some embodiments of the present technology, in the training phase, the server 230, the processor 110 or the prediction module 302 is trained using training inputs comprising datasets from a plurality of training vehicles which had traveled along a road segment, the datasets including (i) a training vehicle characteristic, (ii) a geolocation of the road segment, (iii) a training vehicle parameter at the road segment and a time of training vehicle parameter measurement, optionally (iv) a training road condition at the road segment at the time of the training vehicle parameter measurement, and optionally (v) a training weather condition at the road segment at the time of the training vehicle parameter measurement.

The trained machine-learning algorithm is trained to output a driving condition such as an instruction for the vehicle 220 or for the user to take a driving action, which may be at least one of reducing speed, increasing speed, maintaining speed, applying brakes, releasing brakes, stopping, taking an alternative route, switching gear, turning on or off headlights, adapting headlight angle, adapting the direction of travel, paying attention, and keeping a certain distance from a vehicle in front. The instruction to the vehicle 220 may also includes a command to a control unit of the current vehicle 220 from the electronic device 210 to adapt an operation of the current vehicle 220. In some embodiments, the instruction comprises a command to display a visual representation of the driving action on the display 270 of the electronic device 210 and/or a command to communicate an audio representation of the driving action on the electronic device 210.

The machine-learning model(s) or algorithm(s) may be provided to the server 230 for the server 230 to generate the predicted driving condition for the current vehicle 220. Alternatively, the prediction module 302 may directly host the generated machine-learning model and generate the predicted driving condition for the current vehicle 220.

In the non-limiting example of the training phase shown in FIG. 3, the prediction module 302 has a number of training inputs: a first training dataset 304, a second training dataset 306, a third training dataset 308 and a fourth training dataset 310. It will be clear that any other number of training datasets can be provided as inputs to the prediction module 302.

In this non-limiting example, the first training dataset 304 comprises data received from a first training vehicle traveling along a first road segment and includes a first training vehicle characteristic, a first training vehicle performance whilst traveling along the road segment, and a geolocation of the first road segment. The first training vehicle characteristic comprises one or more parameters associated with an identity of the first training vehicle. In this case, the parameters include vehicle manufacturer, vehicle model, vehicle year of manufacture, vehicle weight, vehicle dimensions, vehicle weight distribution, vehicle surface area, vehicle height, drive train type, tyre type, brake system, fuel system, mileage, vehicle identification number, engine size, engine type, fuel system and the like. The first training vehicle performance includes one or more parameters identifying a functioning of the first training vehicle whilst traveling along the road segment. Non-limiting examples include data comprising absolute values or ranges or delta values including one or more of a slippage of the vehicle, a speed of the vehicle, extent of drifting of the vehicle, vibration of the vehicle, a pressure of a tyre of the vehicle, a pressure distribution in tyres of the vehicle, a tipping of the vehicle, engine temperature, fuel consumption, engine control unit (ECU) data, sensor output data, fuel consumption, energy consumption, a time to reach destination, and the like.

The second training dataset 306 of the non-limiting example of FIG. 3 comprises data received from a second training vehicle traveling along the first road segment and including a second training vehicle characteristic, a second training vehicle performance whilst traveling along the first road segment, the geolocation of the first road segment, and a physical condition of the first road segment at the time that the second training vehicle passed along the first road segment. The physical condition of the first road segment may include parameters defining a property of the road segment, examples of which include at least one of temperature, road surface continuity (e.g. pot holes, cracks, etc), grade (e.g. an incline or a decline), material of the road segment surface (e.g. asphalt, mud), and presence and extent of debris (e.g. sand, ice, snow, water, gravel) on the road segment surface, and the like. The second training vehicle characteristic comprises one or more parameters associated with an identity of the second training vehicle, such as vehicle manufacturer, vehicle model, vehicle year of manufacture, vehicle weight, vehicle dimensions, vehicle weight distribution, vehicle surface area, vehicle height, drive train type, tyre type, brake system, fuel system, mileage, vehicle identification number, engine size, engine type, fuel system and the like. The second training vehicle performance includes one or more parameters identifying a functioning of the second training vehicle whilst traveling along the road segment, such as absolute values or ranges or delta values including one or more of a slippage of the vehicle, a speed of the vehicle, extent of drifting of the vehicle, vibration of the vehicle, tyre pressure, engine temperature, fuel consumption, a tipping of the vehicle, engine control unit (ECU) data, sensor output data, fuel consumption, energy consumption, a time to reach destination, and the like.

The third training dataset 308, as an example, comprises data received from a third training vehicle traveling along the same road segment as the first and second training vehicles and includes a third training vehicle characteristic, a third training vehicle performance whilst traveling along the road segment, the geolocation of the road segment, and a weather condition at the road segment at the time that the third training vehicle traveled along the road segment. The weather condition of the road segment may include parameters defining a property of the environment around the road segment, examples of which include at least one of an air temperature, air pressure, air humidity, air quality, ultraviolet light levels, rain, snow, sleet, ice rain, fog, wind speed, wind direction, brightness levels, sun direction, glare, shadow levels, and the like. The third training vehicle characteristic comprises one or more parameters associated with an identity of the second training vehicle, such as vehicle manufacturer, vehicle model, vehicle year of manufacture, vehicle weight, vehicle dimensions, vehicle weight distribution, vehicle surface area, vehicle height, drive train type, tyre type, brake system, fuel system, mileage, vehicle identification number, engine size, engine type, fuel system and the like. The third training vehicle performance includes one or more parameters identifying a functioning of the third training vehicle whilst traveling along the road segment, such as absolute values or ranges or delta values including one or more of a slippage of the vehicle, a speed of the vehicle, extent of drifting of the vehicle, vibration of the vehicle, tyre pressure, engine temperature, fuel consumption, a tipping of the vehicle, engine control unit (ECU) data, sensor output data, fuel consumption, energy consumption, a time to reach destination, and the like.

The fourth training dataset 310 in the non-limiting example of FIG. 3 comprises data received from a fourth training vehicle (which is the same vehicle as the first training vehicle) traveling along a second road segment (which is different to the first road segment), and includes a fourth training vehicle characteristic (which is the same as the first training vehicle characteristic), a fourth training vehicle performance whilst traveling along the road segment, and a geolocation of the second road segment. The fourth training vehicle characteristic comprises one or more parameters associated with an identity of the fourth training vehicle. In this case, the parameters include vehicle manufacturer, vehicle model, vehicle year of manufacture, vehicle weight, vehicle dimensions, vehicle weight distribution, vehicle surface area, vehicle height, drive train type, tyre type, brake system, fuel system, mileage, vehicle identification number, engine size, engine type, fuel system and the like. The fourth training vehicle performance includes one or more parameters identifying a functioning of the fourth vehicle whilst traveling along the second road segment. Non-limiting examples include data comprising absolute values or ranges or delta values including one or more of a slippage of the vehicle, a speed of the vehicle, extent of drifting of the vehicle, vibration of the vehicle, a pressure of a tyre of the vehicle, a pressure distribution in tyres of the vehicle, a tipping of the vehicle, engine temperature, fuel consumption, engine control unit (ECU) data, sensor output data, fuel consumption, energy consumption, a time to reach destination, and the like.

It will be appreciated that the number of training object sets can be significantly more than the four illustrated herein, and in any combination. For example, training object sets can be provided from a plurality of vehicles, and each vehicle may provide different training object sets from a plurality of geolocations and/or at different time points.

In some embodiments, also included as training inputs to the prediction module 302 during the training phase is information associated with the geolocation of the road segment. For example, a speed limit, a cross-wind danger, a bridge, a height or a width of a tunnel, an altitude, historical data on accidents occurring at the geolocation, and the like. This information can be obtained from any source.

In some embodiments, also included as inputs to the prediction module 302 during the training phase are one or more maps including the road segments associated with the geolocations and alternative routes connected to that road segment. The maps can be obtained from any source.

In some embodiments, also included as inputs to the prediction module 302 during the training phase are one or more traffic conditions for the road segments associated with the geolocations and alternative routes connected to that road segment. The traffic conditions can be obtained from any source.

The inventors have appreciated that the different training vehicle characteristic parameters need not be treated equally as they can have differing extents of influence on a vehicle performance. In this respect, in some embodiments, one or more of the parameters of the training datasets, as part of the training phase, are given a weight or weights (also referred to as "weighting" or "weightings") according to their actual or expected influence on the vehicle performance, and/or a perceived or actual importance to a vehicle performance at the road segment. The weight or weights assigned to the vehicle characteristic parameters can be a function of the weather and/or road condition parameters, or any other factor. For example, the presence of a four-wheel drive to avoid slipping whilst driving a bend is more pertinent under reduced friction conditions such as ice, snow and water, therefore the parameter of the drive train would be given more weighting under the reduced friction conditions.

In some embodiments, the training vehicle characteristic parameters are separated or categorized into different categories before assigning the weighting to each category. The categories can be divided according to which parameters have a similar effect on the vehicle performance on the road segment. The categorization may initially or further divide the identity parameters or the groups into those having a comparable performance under different road conditions, weather conditions, traffic conditions and the like. In other words, in some embodiments, the weighting assigned to at least one of the different categories is related to a vehicle performance on the road segment as a function of a weather parameter, a road condition parameter, and/or a road condition parameter.

In some embodiments, the training datasets are time-stamped. This can allow the prediction module 302 to establish the training phase based on a certain 'freshness' of the data. This may be particularly relevant for road condition parameters as this data can become stale e.g. after road maintenance. In some embodiments, the training phase is based on training using datasets which were obtained less than 18 months, 17 months, less than 16 months, less than 15 months, less than 14 months, less than 13 months, less than 12 months, less than 11 months, and less than 10 months (or any other suitable period of time, which can be shorter or longer) from a current operation time (also referred to as "current time" of the embodiments of the method and system described herein.

After the machine-learning algorithm or model has been trained, the server 230 or the predicting module 302 is configured to generate the predicted driving condition for the current vehicle in real-time by feeding in inputs into the trained machine-learning algorithm (which is a complex expression of the hidden interdependencies of the parameters in the training datasets). This occurs once the server has received an indication of the current vehicle approaching the road segment, and has obtained the relevant inputs. In certain embodiments, the inputs comprise the current vehicle characteristic and at least one preceding vehicle characteristic of a preceding vehicle.

The preceding vehicle is a vehicle having a preceding vehicle characteristic and which has a time of travel along the road segment which is before a current time. In other words, the preceding vehicle is a vehicle which has reached the road segment before the current vehicle. In certain embodiments, a time difference between the preceding vehicle time of travel and the current time is within an acceptable predetermined range which can be any time interval. For example, the acceptable predetermined time range is any one of 1-5 minutes, 5-10 minutes, 10-15 minutes, 15-20 minutes, 20-25 minutes, 25-30 minutes, 30-35 minutes, 35-40 minutes, 40-45 minutes, 45-50 minutes, 50-55 minutes, 55-60 minutes, or any other suitable predetermined value such as less than 5 minutes, less than 10 minutes, less than 15 minutes, less than 20 minutes, less than 25 minutes, less than 30 minutes, less than 35 minutes, less than 40 minutes, less than 50 minutes, less than 55 minutes, less than 60 minutes.

In certain embodiments, the server is arranged to receive and input other inputs into the machine-learning algorithm, such as a preceding vehicle performance of the at least one preceding vehicle, a current vehicle performance, a current road condition at the road segment, a current road condition at the time of the preceding vehicle reaching or traveling along the road segment, a current weather condition at the road segment or at a current position of the current vehicle, and the like. The server 230 may also estimate a current road condition of the road segment based on historical data and/or auxiliary data such as timetabled road maintenance.

In one or both of the training phase and the current operation phase, data associated with the current vehicle characteristic, the preceding vehicle characteristic, training vehicle characteristic, the current vehicle performance, the preceding vehicle performance, the training vehicle performance, the current weather, the current road conditions, the training weather, the training road conditions, geolocation, and the like, can be obtained and provided to the prediction module 302 and/or the server 230 in any suitable manner.

In some embodiments, this data is obtained through sensors associated with the vehicle and in communication with the electronic device 210 across the communication network 240 or via the GPS satellite 250. For example, the vehicle performance parameters can be provided by sensors located on the vehicle itself.

In some embodiments, the data is obtained through remote sensors, such as those associated with the road segment and in communication with the electronic device 210 or the server 230. For example, sensors located at the geolocation may measure performance parameters of vehicles passing thereby, e.g. vehicle drifting or slipping at the road segment of that geolocation. Data may be sent from the remote sensors to the electronic device 210 and/or the server 230 and matched with the associated vehicle characteristic data if required. In some embodiments, the vehicle characteristic parameters may be otherwise determined, such as by measurement by a third party, and stored or transmitted to the electronic device 210 associated with the vehicle, and/or transmitted to the server 230. Data associated with the vehicle characteristic may be updated as needed, for example on change of tyres from summer tyres to winter tyres. The geolocation can be measured by the GPS satellite 250.

In this respect, the server 230 and/or the electronic device 210 are/is arranged to receive, and optionally store any data associated with the current vehicle characteristic, the preceding vehicle characteristic, training vehicle characteristic, the current vehicle performance, the preceding vehicle performance, the training vehicle performance, the current weather, the current road conditions, the training weather, the training road conditions, geolocation, and the like in any convenient manner. The electronic device 210 is arranged to transmit the data to the prediction module 302 and/or to the server 230 in any convenient manner, for example through the network module 140 or the GPS module 150. In similar manner, the server 230 and/or the predicting module 302 are/is arranged to receive the data in any convenient manner, for example through the network module 140 or the GPS module 150.

In some embodiments, transmission of the data to the server 230 and/or the predicting module 302, for example during the training phase, occurs at predetermined time intervals such as every day, every week, every month, or every two months. The data may be submitted on receipt of a request from the server 230 or prediction module 302. In some embodiments, the data may be transmitted 'live' i.e. as and when they are measured. In some embodiments, the data may be transmitted on receipt of a trigger, for example, on the vehicle reaching a certain geolocation or acquiring a certain volume of data.

The server 230 is also arranged, such as through the network module 140 and/or the GPS module 150, to receive the indication of the current vehicle 220 approaching the road segment and the current vehicle characteristic of the current vehicle 220 in order to provide to the current vehicle the predicted driving condition, before the current vehicle passes through the road segment. The server 230 may also be arranged to receive this information in any other alternative or complimentary manner. The indication of the current vehicle approaching the road segment and the current vehicle characteristic may or may not be received at the same time by the server 230.

In some embodiments, the server 230 and/or the predicting module 302 are/is configured to send the predicted driving condition to the electronic device 210 on receipt of a trigger. Non-limiting examples of the trigger include at least one of: at least one current performance parameter of the current vehicle being outside of a predetermined acceptable threshold range for the current vehicle characteristic; a current road condition parameter of the road segment being outside of a predetermined acceptable threshold range for the current vehicle characteristic; a current weather condition parameter at the road segment being outside of a predetermined acceptable threshold range for the current vehicle characteristic; and a user-activated trigger.

Figure 4:
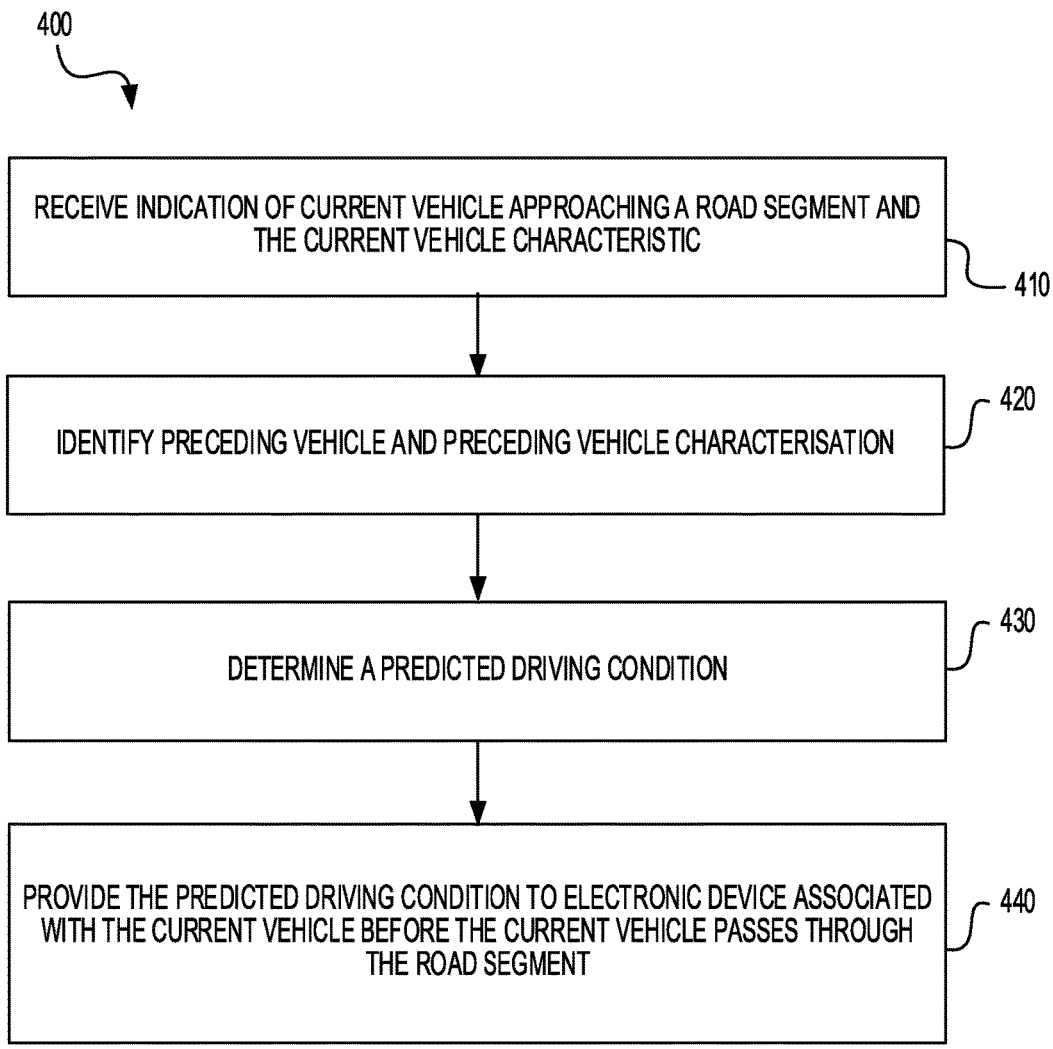
FIG. 4 depicts a block diagram of a method according to one embodiment of the present technology.

Referring now to FIG. 4, there is shown a flow chart of an embodiment of a method 400 of the present technology. More specifically, FIG. 4 shows a computer-implemented method 400 for providing the predicted driving condition to the electronic device, the electronic device being associated with the current vehicle or with the user operating the current vehicle 220, the current vehicle 220 having a current vehicle characteristic. The method 300 may be carried out, for example, in the context of the server 230 of FIG. 2 having the processor 110 of FIG. 1 executing program instructions loaded into its memory 130.

At Step 410, the server 230 receives an indication of the current vehicle approaching the road segment and the current vehicle characteristic of the current vehicle. As noted earlier, the current vehicle characteristic of the current vehicle need not be received at the same time as the indication of the current vehicle's approach to the road segment. The server 230 may also receive a current weather condition parameter, a current road condition parameter or a current traffic condition parameter, for use in generating the predicted driving condition. In some embodiments, the receiving the indication of the current vehicle 220 approaching the road segment is executed in response to the user of the electronic device 210 providing an indication of a user-desire to receive the predicted driving condition.

At Step 420, the server 230 identifies at least one preceding vehicle which has a time of travel along the road segment which is before a current time, a time difference between the preceding vehicle time of travel and the current time being within an acceptable predetermined range. The preceding vehicle has a preceding vehicle characteristic which the server 230 receives.

At Step 430, the server 230 determines the predicted driving condition for the current vehicle for the road segment, the predicted driving condition being based on the current vehicle characteristic of the current vehicle and the preceding vehicle characteristic of the preceding vehicle. In certain embodiments, the determining the predicted driving condition comprises inputting a current input comprising the current vehicle characteristic and the preceding vehicle characteristic into a machine-learning algorithm, the machine-learning algorithm having been trained on training inputs comprising datasets from a plurality of training vehicles which had traveled along the road segment, each dataset comprising, for a given training vehicle from the plurality of training vehicles, a training vehicle characteristic of the given training vehicle and a training vehicle performance of the given training vehicle whilst it had traveled along the road segment.

At Step 440, the server provides the predicted driving condition associated with the current vehicle, to the electronic device 210 associated with the current vehicle 220 before the current vehicle passes through the road segment.

Before the server 230 provides the predicted driving condition to the current vehicle 220, the server 230 may determine whether to send the predicted driving suggestion to the electronic device 210 based on a trigger. The trigger can be any appropriate event, such as: at least one current performance parameter of the current vehicle 220 being outside of a predetermined acceptable threshold range for the current vehicle characteristic; a current road condition parameter of the road segment being outside of a predetermined acceptable threshold range for the current vehicle characteristic; a current weather condition parameter at the road segment being outside of a predetermined acceptable threshold range for the current vehicle characteristic; or a user-activated trigger.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

Embodiments of the present technology can be summarized as follows, expressed in numbered clauses.

Clauses

CLAUSE 1. A method for providing a predicted driving condition to an electronic device 210, the electronic device 210 being associated with a current vehicle 220 having a current vehicle characteristic, the method 400 executable on a server 230, the method comprising: receiving, by the server 230, an indication of the current vehicle 220 approaching a road segment and the current vehicle characteristic of the current vehicle 220; identifying, by the server 230, at least one preceding vehicle which has a time of travel along the road segment which is before a current time, a time difference between the preceding vehicle time of travel and the current time being within an acceptable predetermined range, the preceding vehicle having a preceding vehicle characteristic; determining, by the server 230, the predicted driving condition for the current vehicle for the road segment, the predicted driving condition being based on the current vehicle characteristic of the current vehicle 220 and the preceding vehicle characteristic of the preceding vehicle; and providing, by the server 230, to the electronic device 210 associated with the current vehicle 220 before the current vehicle 220 reaches the road segment, the predicted driving condition for the current vehicle 220 on the road segment.

CLAUSE 2. The method of clause 1, further comprising obtaining a preceding vehicle performance of the at least one preceding vehicle along the road segment, and wherein the determining of the predicted driving condition for the current vehicle 220 for the road segment is also based on the preceding vehicle performance of the preceding vehicle.

CLAUSE 3. The method of clause 1 or clause 2, further comprising obtaining a current road condition at the time of receiving the indication of the current vehicle 220 approaching the road segment, and wherein the determining of the predicted driving condition for the current vehicle 220 for the road segment is also based on the current road condition.

CLAUSE 4. The method of clause 3, wherein the current road condition is calculated from a current weather condition and a historic road condition of the road segment.

CLAUSE 5. The method of any of clauses 1 to 4, further comprising obtaining a current weather condition at the time of receiving the indication of the current vehicle approaching the road segment, and wherein the determining of the predicted driving condition for the current vehicle for the road segment is also based on the current weather condition.

CLAUSE 6. The method of any of clauses 1 to 5, wherein the identifying the at least one preceding vehicle comprises accessing a database in which data on the at least one preceding vehicle is stored, the data including the preceding vehicle characteristic and the time of travel along the road segment of the preceding vehicle.

CLAUSE 7. The method of any of clauses 1 to 6, wherein the determining the predicted driving condition comprises inputting a current input comprising the current vehicle characteristic and the preceding vehicle characteristic into a machine-learning algorithm, the machine-learning algorithm having been trained on training inputs comprising datasets from a plurality of training vehicles which had traveled along the road segment, each dataset comprising, for a given training vehicle from the plurality of training vehicles, a training vehicle characteristic of the given training vehicle and a training vehicle performance of the given training vehicle whilst it had traveled along the road segment.

CLAUSE 8. The method of clause 7, wherein each dataset has a time stamp representing a time when the given vehicle had traveled along the road segment, the machine-learning algorithm having been trained on datasets obtained within an acceptable predetermined time range of the time stamp relative to the current time.

CLAUSE 9. The method of clause 7 or clause 8, wherein the plurality of datasets are from a plurality of vehicles traveling along a plurality of different road segments, each dataset including a geolocation of each one of the plurality of different road segments.

CLAUSE 10. The method of any of clauses 7 to 9, wherein at least one of the plurality of datasets includes a training road condition of the road segment whilst the given training vehicle was traveling along the road segment.

CLAUSE 11. The method of any of clauses 7 to 10, wherein at least one of the plurality of datasets includes a training weather condition at the road segment whilst the given training vehicle was traveling along the road segment.

CLAUSE 12. The method of any of clauses 7 to 11, wherein the training input also includes a weighting of a plurality of training vehicle characteristic parameters of the training vehicle characteristic and/or a weighting of a plurality of training vehicle performance parameters of the training vehicle performance.

CLAUSE 13. The method of clause 10 or clause 12, wherein the training input also includes a weighting of a plurality of training weather condition of the training weather condition and/or a weighting of a plurality of training road condition parameters of the training road conditions.

CLAUSE 14. The method of any of clauses 1 to 13, further comprising determining by the server 230 whether to send the predicted driving condition to the electronic device 210 based on a trigger.

CLAUSE 15. The method of clause 14, further comprising receiving, by the server 230, a current vehicle performance of the current vehicle 220, the current vehicle performance comprising a plurality of current vehicle performance parameters, wherein the trigger comprises at least one of the current performance parameters of the current vehicle 220 being outside of a predetermined acceptable threshold range.

CLAUSE 16. The method of clause 14, further comprising receiving, by the server 230, a current road condition of the road segment, the current road condition comprising a plurality of current road condition parameters, wherein the trigger comprises at least one of the current road condition parameters being outside of a predetermined acceptable threshold range.

CLAUSE 17. The method of clause 14, further comprising receiving, by the server 230, a current weather condition at the road segment, the current weather condition comprising a plurality of current weather condition parameters, wherein the trigger comprises at least one of the current weather condition parameters being outside of a predetermined acceptable threshold range.

CLAUSE 18. The method of any of clauses 1 to 17, wherein the current road condition or the training road condition each comprise at least one of the following parameters: a temperature of a surface of the road segment, a continuity of a surface of the road segment, a grade of a surface of the road segment, a material of a surface of the road segment, and presence/extent of debris on a surface of the road segment.

CLAUSE 19. The method of any of clauses 1 to 18, wherein the current weather condition or the training weather condition each comprise at least one of the following parameters: an air temperature, air pressure, air humidity, air quality, ultra-violet light levels, rain, snow, sleet, ice rain, fog, wind speed, wind direction, brightness levels, sun direction, glare, and shadow levels.

CLAUSE 20. The method of any of clauses 1 to 19, wherein the current vehicle performance, the preceding vehicle performance or the training vehicle performance each comprise at least one of the following parameters: a slippage of the vehicle, a speed of the vehicle, drifting of the vehicle, vibration of the vehicle, a pressure of a tyre of the vehicle, a pressure distribution in tyres of the vehicle, engine temperature, fuel consumption, a tipping of the vehicle, engine control unit (ECU) data, and sensor output data.

CLAUSE 21. The method of any of clauses 1 to 20, wherein the current vehicle characteristic, the preceding vehicle characteristic and the training vehicle characteristic each comprise at least one of the following parameters: vehicle manufacturer, vehicle model, vehicle year of manufacture, vehicle weight, vehicle dimensions, vehicle weight distribution, vehicle surface area, vehicle height, drive train type, tyre type, brake system, fuel system, mileage, vehicle identification number, and engine size.

CLAUSE 22. The method of any of clauses 1 to 21, wherein the predicted driving condition provided to the electronic device 210 comprises an instruction for the vehicle 220 or the user to take a driving action.

CLAUSE 23. The method of clause 22, wherein the instruction is at least one of: reducing speed, increasing speed, maintaining speed, applying brakes, releasing brakes, stopping, taking an alternative route, switching gear, turning on or off headlights, adapting headlight angle, adapting the direction of travel, paying attention, and keeping a certain distance from a vehicle in front.

CLAUSE 24. The method of clause 22 or clause 23, wherein the instruction to the vehicle 220 also includes a command to a control unit of the vehicle 220 from the electronic device 210 to adapt an operation of the vehicle 220.

CLAUSE 25. The method of any of clauses 22 to 24, wherein the instruction comprises a command to display a visual representation of the driving action on a display 270 of the electronic device 210.

CLAUSE 26. The method of any of clauses 22 to 25, wherein the instruction comprises a command to communicate an audio representation of the driving action on the electronic device 210.

CLAUSE 27. The method of any of clauses 1 to 26, wherein the receiving is executed in response to the user of the electronic device 210 providing an indication of a user-desire to receive the predicted driving condition.

CLAUSE 28. The method of any of clauses 1 to 27, wherein receiving the indication of the current vehicle 220 approaching the road segment by the server 230 is via a Global Positioning System.

CLAUSE 29. A computer-implemented system for providing a predicted driving condition to an electronic device 210, the electronic device 210 being associated with a current vehicle 220 having a current vehicle characteristic, the system 200 comprising: a receiver configured to receive an indication of the current vehicle 220 approaching a road segment and the current vehicle characteristic of the current vehicle 220; a processor 110 configured to: identify at least one preceding vehicle which has a time of travel along the road segment which is before a current time, a time difference between the preceding vehicle time of travel and the current time being within an acceptable predetermined range, the preceding vehicle having a preceding vehicle characteristic; and determine by the server 230, the predicted driving condition for the current vehicle 220 for the road segment, the predicted driving condition being based on the current vehicle characteristic of the current vehicle 220 and the preceding vehicle characteristic of the preceding vehicle; a transmitter for transmitting, to the electronic device 210 associated with the current vehicle 220 before the current vehicle 220 reaches the road segment, the predicted driving condition for the current vehicle 220 on the road segment.

CLAUSE 30. The system of clause 29, wherein the processor is further configured to obtain a preceding vehicle performance of the at least one preceding vehicle along the road segment, and base the determining of the predicted driving condition for the current vehicle 220 for the road segment also on the preceding vehicle performance of the preceding vehicle.

CLAUSE 31. The system of clause 29 or 30, wherein the processor 110 is further configured to obtain a current road condition at the time of receiving the indication of the current vehicle 220 approaching the road segment, and base the determining of the predicted driving condition for the current vehicle 220 for the road segment also on the current road condition.

CLAUSE 32. The system of clause 31, wherein the processor 110 is further configured to calculate the current road condition from a current weather condition and a historic road condition of the road segment.

CLAUSE 33. The system of any of clauses 29 to 32, wherein the processor 110 is further configured to obtain a current weather condition at the time of receiving the indication of the current vehicle 220 approaching the road segment, and base the determining of the predicted driving condition for the current vehicle 220 for the road segment also on the current weather condition.

CLAUSE 34. The system of any of clauses 29 to 33, wherein the processor 110 is configured to access a database in which data on the at least one preceding vehicle is stored, the data including the preceding vehicle characteristic and the time of travel along the road segment of the preceding vehicle, to identify the at least one preceding vehicle.

CLAUSE 35. The system of any of clauses 29 to 34, wherein the determining the predicted driving condition comprises inputting a current input comprising the current vehicle characteristic and the preceding vehicle characteristic into a machine-learning algorithm, the machine-learning algorithm having been trained on training inputs comprising datasets from a plurality of training vehicles which had traveled along the road segment, each dataset comprising, for a given training vehicle from the plurality of training vehicles, a training vehicle characteristic of the given training vehicle and a training vehicle performance of the given training vehicle whilst it had traveled along the road segment.

CLAUSE 36. The system of clause 35, wherein each dataset has a time stamp representing a time when the given vehicle had traveled along the road segment, the machine-learning algorithm having been trained on datasets obtained within an acceptable predetermined time range of the time stamp relative to the current time.

CLAUSE 37. The system of clause 35 or clause 36, wherein the plurality of datasets are from a plurality of vehicles traveling along a plurality of different road segments, each dataset including a geolocation of each one of the plurality of different road segments.

CLAUSE 38. The system of any of clauses 35 to 37, wherein at least one of the plurality of datasets includes a training road condition of the road segment whilst the given training vehicle was traveling along the road segment.

CLAUSE 39. The system of any of clauses 35 to 37, wherein at least one of the plurality of datasets includes a training weather condition at the road segment whilst the given training vehicle was traveling along the road segment.

CLAUSE 40. The system of any of clauses 35 to 37, wherein the training input also includes a weighting of a plurality of training vehicle characteristic parameters of the training vehicle characteristic and/or a weighting of a plurality of training vehicle performance parameters of the training vehicle performance.

CLAUSE 41. The system of clause 39 or clause 40, wherein the training input also includes a weighting of a plurality of training weather condition of the training weather condition and/or a weighting of a plurality of training road condition parameters of the training road conditions.

CLAUSE 42. The system of any of clauses 29 to 41, wherein the processor 110 is configured to determine whether to send the predicted driving condition to the electronic device 210 based on a trigger.

CLAUSE 43. The system of clause 42, wherein the processor 110 is configured to receive a current vehicle performance of the current vehicle 220, the current vehicle performance comprising a plurality of current vehicle performance parameters, wherein the trigger comprises at least one of the current performance parameters of the current vehicle 220 being outside of a predetermined acceptable threshold range.

CLAUSE 44. The system of clause 42, wherein the processor 110 is configured to receive a current road condition of the road segment, the current road condition comprising a plurality of current road condition parameters, wherein the trigger comprises at least one of the current road condition parameters being outside of a predetermined acceptable threshold range.

CLAUSE 45. The system of clause 42, wherein the processor 110 is configured to receive a current weather condition at the road segment, the current weather condition comprising a plurality of current weather condition parameters, wherein the trigger comprises at least one of the current weather condition parameters being outside of a predetermined acceptable threshold range.

CLAUSE 46. The system of any of clauses 29 to 45, wherein the current road condition or the training road condition each comprise at least one of the following parameters: a temperature of a surface of the road segment, a continuity of a surface of the road segment, a grade of a surface of the road segment, a material of a surface of the road segment, and presence/extent of debris on a surface of the road segment.

CLAUSE 47. The system of any of clauses 29 to 46, wherein the current weather condition or the training weather condition each comprise at least one of the following parameters: an air temperature, air pressure, air humidity, air quality, ultra-violet light levels, rain, snow, sleet, ice rain, fog, wind speed, wind direction, brightness levels, sun direction, glare, and shadow levels.

CLAUSE 48. The system of any of clauses 29 to 47, wherein the current vehicle performance, the preceding vehicle performance or the training vehicle performance each comprise at least one of the following parameters: a slippage of the vehicle, a speed of the vehicle, drifting of the vehicle, vibration of the vehicle, a pressure of a tyre of the vehicle, a pressure distribution in tyres of the vehicle, engine temperature, fuel consumption, a tipping of the vehicle, engine control unit (ECU) data, and sensor output data.

CLAUSE 49. The system of any of clauses 29 to 48, wherein the current vehicle characteristic, the preceding vehicle characteristic and the training vehicle characteristic each comprise at least one of the following parameters: vehicle manufacturer, vehicle model, vehicle year of manufacture, vehicle weight, vehicle dimensions, vehicle weight distribution, vehicle surface area, vehicle height, drive train type, tyre type, brake system, fuel system, mileage, vehicle identification number, and engine size.

CLAUSE 50. The system of any of clauses 29 to 49, wherein the predicted driving condition provided to the electronic device comprises an instruction for the current vehicle 220 or the user to take a driving action.

CLAUSE 51. The system of clause 50, wherein the instruction is at least one of: reducing speed, increasing speed, maintaining speed, applying brakes, releasing brakes, stopping, taking an alternative route, switching gear, turning on or off headlights, adapting headlight angle, adapting the direction of travel, paying attention, and keeping a certain distance from a vehicle in front.

CLAUSE 52. The system of clause 50 or clause 51, wherein the instruction to the current vehicle 220 also includes a command to a control unit of the current vehicle 220 from the electronic device 210 to adapt an operation of the current vehicle 220.

CLAUSE 53. The system of any of clauses 50 to 52, wherein the instruction comprises a command to display a visual representation of the driving action on a display 270 of the electronic device 210.

CLAUSE 54. The system of any of clauses 50 to 53, wherein the instruction comprises a command to communicate an audio representation of the driving action on the electronic device 210.

CLAUSE 55. The system of any of clauses 29 to 54, wherein the processor 110 is configured to receive the indication of the current vehicle approaching the road segment in response to the user of the electronic device providing an indication of a user-desire to receive the predicted driving condition.

CLAUSE 56. The system of any clauses 1 to 55, wherein receiving the indication of the current vehicle 220 approaching the road segment by the server is via a Global Positioning System.

The invention claimed is:

1. A method for providing a predicted driving condition to an electronic device, the electronic device being associated with a current vehicle having a current vehicle characteristic, the method executable on a server, the method comprising:
   receiving, by the server, an indication of the current vehicle approaching a road segment and the current vehicle characteristic of the current vehicle;
   identifying, by the server, at least one preceding vehicle which has a time of travel along the road segment which is before a current time, a time difference between the preceding vehicle time of travel and the current time being within an acceptable predetermined range, the preceding vehicle having a preceding vehicle characteristic;
   determining, by the server, the predicted driving condition for the current vehicle for the road segment, the predicted driving condition being based on the current vehicle characteristic of the current vehicle and the preceding vehicle characteristic of the preceding vehicle; and
   providing, by the server, to the electronic device associated with the current vehicle before the current vehicle reaches the road segment, the predicted driving condition for the current vehicle on the road segment.

2. The method of claim 1, further comprising obtaining a preceding vehicle performance of the at least one preceding vehicle along the road segment, and wherein the determining of the predicted driving condition for the current vehicle for the road segment is also based on the preceding vehicle performance of the preceding vehicle.

3. The method of claim 1, further comprising obtaining a current road condition at the time of receiving the indication of the current vehicle approaching the road segment, and wherein the determining of the predicted driving condition for the current vehicle for the road segment is also based on the current road condition.

4. The method of claim 1, further comprising obtaining a current weather condition at the time of receiving the indication of the current vehicle approaching the road segment, and wherein the determining of the predicted driving condition for the current vehicle for the road segment is also based on the current weather condition.

5. The method of claim 1, wherein the determining the predicted driving condition comprises inputting a current input comprising the current vehicle characteristic and the preceding vehicle characteristic into a machine-learning algorithm, the machine-learning algorithm having been trained on training inputs comprising datasets from a plurality of training vehicles which had traveled along the road segment, each dataset comprising, for a given training vehicle from the plurality of training vehicles, a training vehicle characteristic of the given training vehicle and a training vehicle performance of the given training vehicle whilst it had traveled along the road segment.

6. The method of claim 5, wherein each dataset has a time stamp representing a time when the given vehicle had traveled along the road segment, the machine-learning algorithm having been trained on datasets obtained within an acceptable predetermined time range of the time stamp relative to the current time.

7. The method of claim 5, wherein the plurality of datasets are from a plurality of vehicles traveling along a plurality of different road segments, each dataset including a geolocation of each one of the plurality of different road segments.

8. The method of claim 5, wherein at least one of the plurality of datasets includes at least one of: a training road condition of the road segment whilst the given training vehicle was traveling along the road segment, a training weather condition at the road segment whilst the given training vehicle was traveling along the road segment.

9. The method of claim 5, wherein the training input also includes a weighting of a plurality of training vehicle characteristic parameters of the training vehicle characteristic and/or a weighting of a plurality of training vehicle performance parameters of the training vehicle performance.

10. The method of claim 1, further comprising determining by the server whether to send the predicted driving condition to the electronic device based on a trigger.

11. The method of claim 10, further comprising receiving, by the server, a current vehicle performance of the current vehicle, the current vehicle performance comprising a plurality of current vehicle performance parameters, wherein the trigger comprises at least one of the current performance parameters of the current vehicle being outside of a predetermined acceptable threshold range.

12. The method of claim 10, further comprising receiving, by the server, a current road condition of the road segment, the current road condition comprising a plurality of current road condition parameters, wherein the trigger comprises at least one of the current road condition parameters being outside of a predetermined acceptable threshold range.

13. The method of claim 10, further comprising receiving, by the server, a current weather condition at the road segment, the current weather condition comprising a plurality of current weather condition parameters, wherein the trigger comprises at least one of the current weather condition parameters being outside of a predetermined acceptable threshold range.

14. The method of claim 1, wherein the current road condition comprises at least one of the following parameters: a temperature of a surface of the road segment, a continuity of a surface of the road segment, a grade of a surface of the road segment, a material of a surface of the road segment, and presence/extent of debris on a surface of the road segment.

15. The method of claim 1, wherein the current weather condition comprises at least one of the following parameters: an air temperature, air pressure, air humidity, air quality, ultra-violet light levels, rain, snow, sleet, ice rain, fog, wind speed, wind direction, brightness levels, sun direction, glare, and shadow levels.

16. The method of claim 1, wherein the current vehicle performance and the preceding vehicle performance each comprise at least one of the following parameters: a slippage of the vehicle, a speed of the vehicle, drifting of the vehicle, vibration of the vehicle, a pressure of a tyre of the vehicle, a pressure distribution in tyres of the vehicle, engine temperature, fuel consumption, a tipping of the vehicle, engine control unit (ECU) data, and sensor output data.

17. The method of claim 1, wherein the current vehicle characteristic and the preceding vehicle characteristic each comprise at least one of the following parameters: vehicle manufacturer, vehicle model, vehicle year of manufacture, vehicle weight, vehicle dimensions, vehicle weight distribution, vehicle surface area, vehicle height, drive train type, tyre type, brake system, fuel system, mileage, vehicle identification number, and engine size.

18. The method of claim 1, wherein the predicted driving condition provided to the electronic device comprises an instruction to take a driving action, the instruction being at least one of: reducing speed, increasing speed, maintaining speed, applying brakes, releasing brakes, stopping, taking an alternative route, switching gear, turning on/off headlights, adapting headlight angle, adapting the direction of travel, paying attention, and keeping a certain distance from a vehicle in front.

19. The method of claim 18, wherein the instruction comprises a command to display a visual representation of the driving action on a display of the electronic device and/or a command to communicate an audio representation of the driving action on the electronic device.

20. A computer-implemented system for providing a predicted driving condition to an electronic device, the electronic device being associated with a current vehicle having a current vehicle characteristic, the system comprising:
 a receiver configured to receive an indication of the current vehicle approaching a road segment and the current vehicle characteristic of the current vehicle;
 a processor configured to:
  identify at least one preceding vehicle which has a time of travel along the road segment which is before a current time, a time difference between the preceding vehicle time of travel and the current time being within an acceptable predetermined range, the preceding vehicle having a preceding vehicle characteristic; and
  determine by the server, the predicted driving condition for the current vehicle for the road segment, the predicted driving condition being based on the current vehicle characteristic of the current vehicle and the preceding vehicle characteristic of the preceding vehicle;
 a transmitter for transmitting, to the electronic device associated with the current vehicle before the current vehicle reaches the road segment, the predicted driving condition for the current vehicle on the road segment.

* * * * *